June 23, 1970     W. F. COX     3,516,708
HARDTOP CAMPING TRAILER

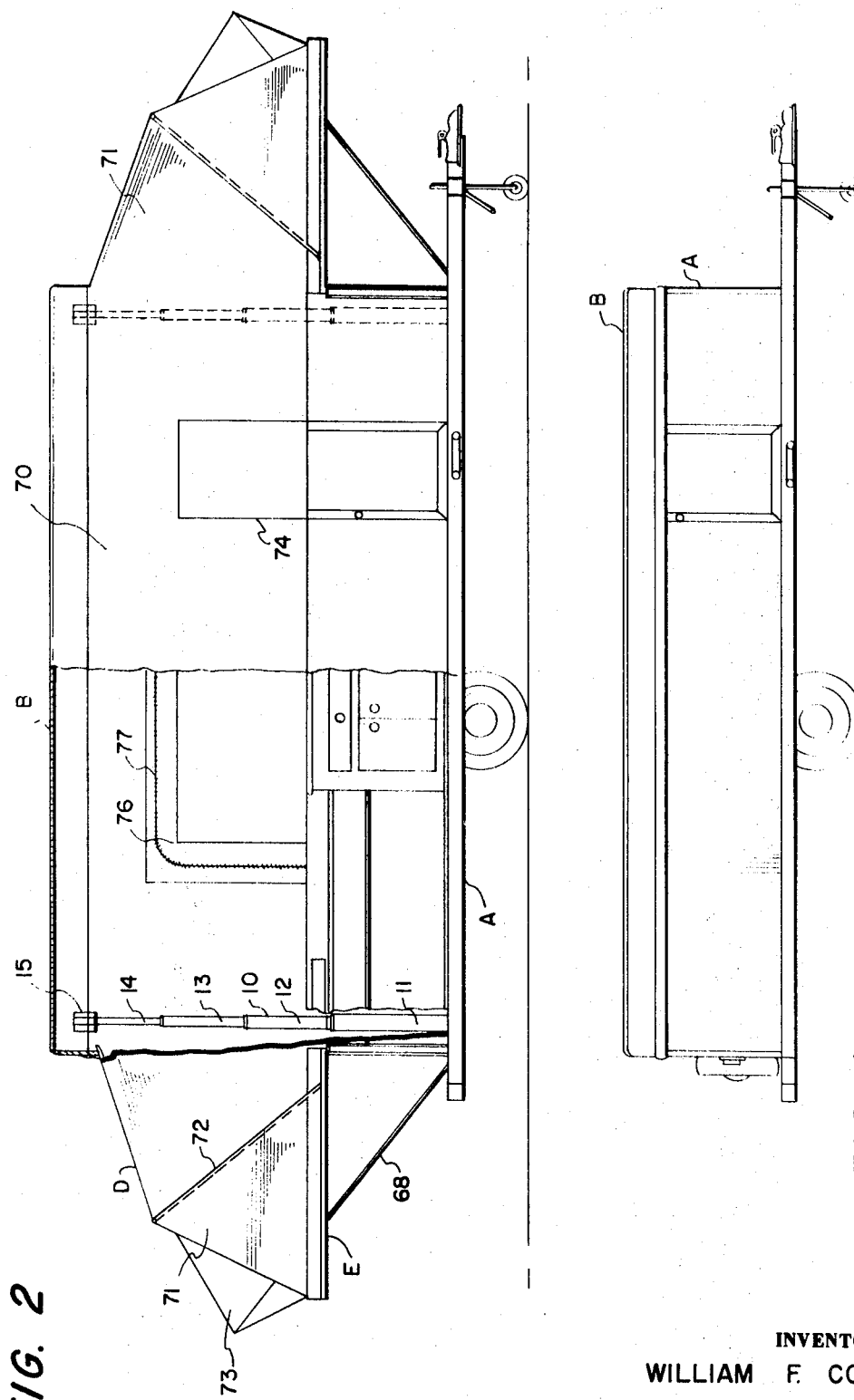

Filed Dec. 3, 1968     5 Sheets-Sheet 3

INVENTOR
WILLIAM F. COX

ATTORNEY

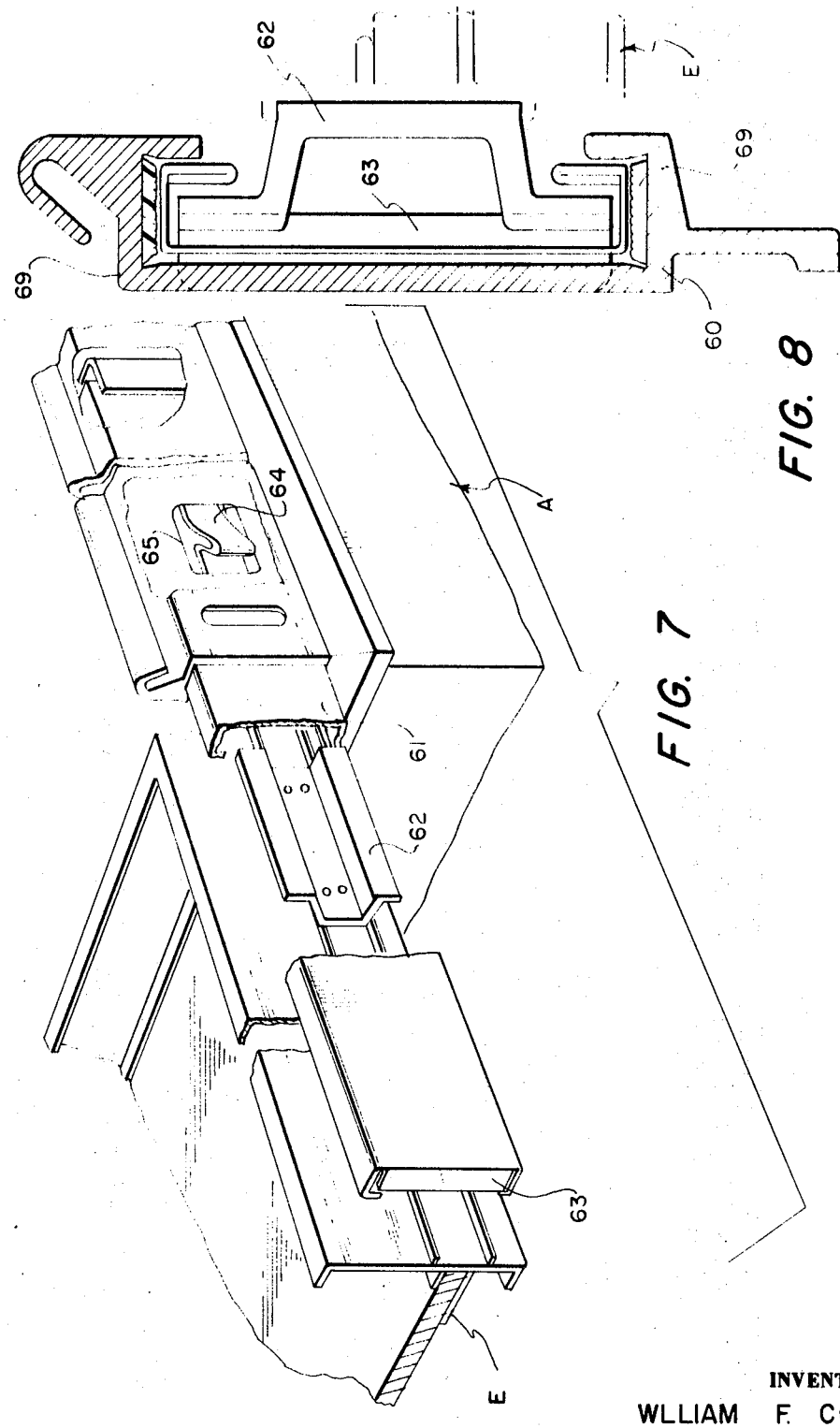

June 23, 1970  W. F. COX  3,516,708
HARDTOP CAMPING TRAILER
Filed Dec. 3, 1968  5 Sheets-Sheet 5
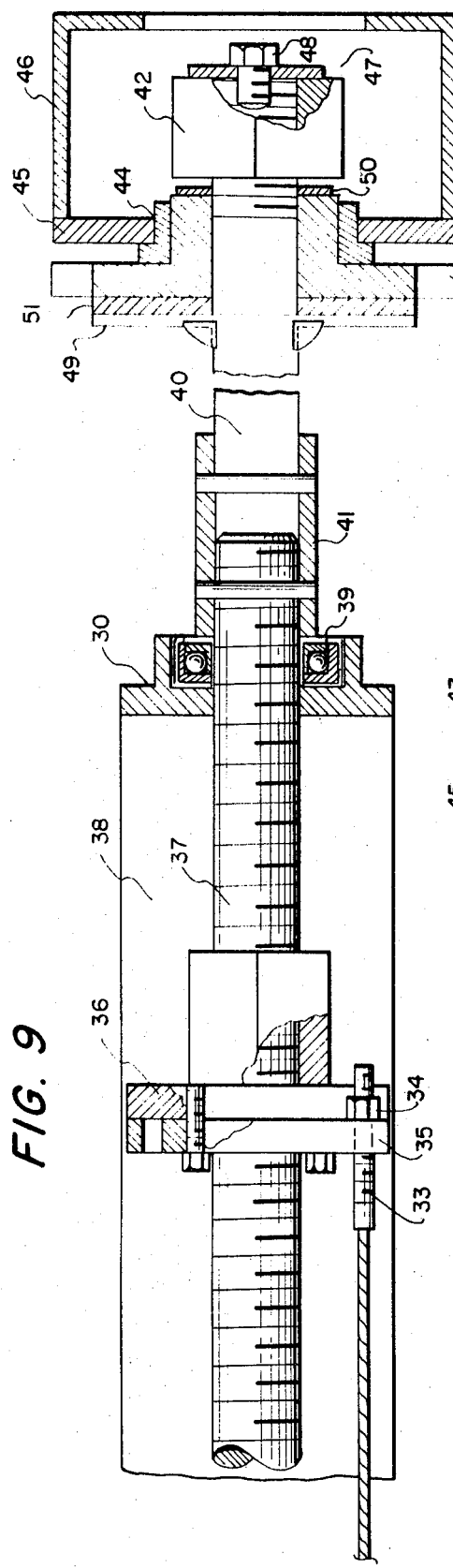
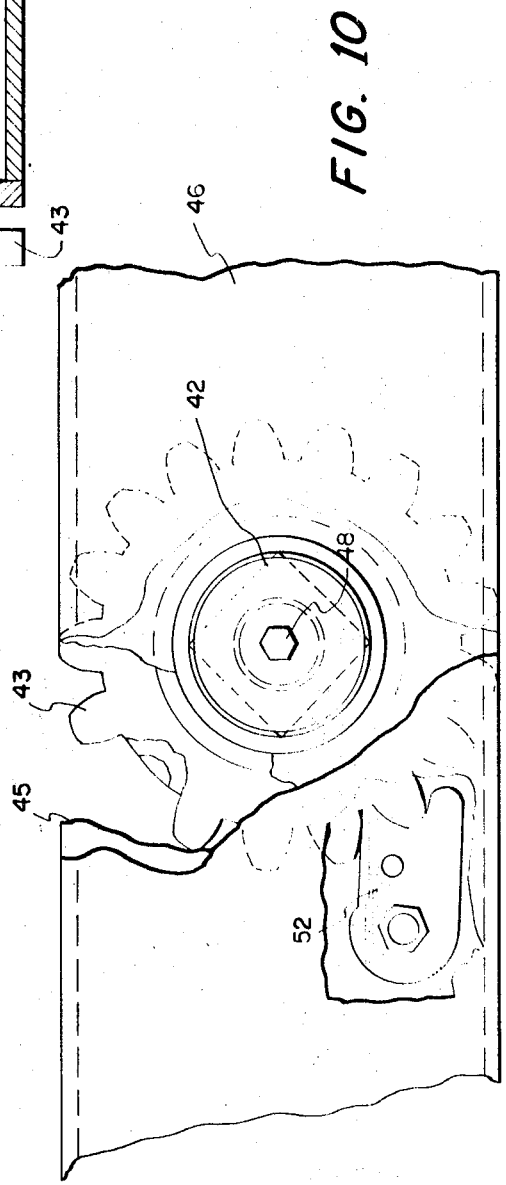
INVENTOR
WILLIAM F. COX
BY *Revere B. Gurley*
ATTORNEY

United States Patent Office 3,516,708
Patented June 23, 1970

3,516,708
HARDTOP CAMPING TRAILER
William F. Cox, % Cox Trailers, Inc.,
Grifton, N.C. 28530
Filed Dec. 3, 1968, Ser. No. 780,756
Int. Cl. B60p 3/32
U.S. Cl. 296—23                                                    4 Claims

ABSTRACT OF THE DISCLOSURE

The camping trailer is contained within a trailer body covered by a hardtop. Four corner posts, at each corner of the body, each formed by four telescoping sections, may be extended by cords operated from a central manually actuated mechanism, and raise the top into expanded position. Two bunks at opposite ends are mounted on slides to move outwardly from the body. Canvas side and end walls are opened into position by movement of the top and bunks. The manual operating mechanism includes friction mechanism for pulling on the cords to raise the top and to maintain the top in its raised position.

NATURE AND OBJECTS OF INVENTION

This invention relates to a trailer for camping, in which the body may be expanded to furnish living quarters and may be collapsed for travel on the road. The trailer has a rigid top with fabric walls and ends connected to the top, and slidable beds at the ends connected to the fabric ends, so that raising the top and sliding out the beds also raises the fabric walls.

The top is raised by four telescoping posts at the corners of the body, the posts being extended by a central manually operated mechanism. The beds may be slid out from the trailer body after the top has been raised.

It is the object of this invention to provide a camping trailer having a rigid top which may be quickly raised manually from a central operating mechanism and slidable bunks which may be opened outwardly, so that the trailer may be quickly expanded for occupancy with its side and end walls in place. The trailer may be as quickly collapsed for travel, the top resting on the trailer body and confining the lowered fabric walls and contents.

DRAWINGS

Figure 3:
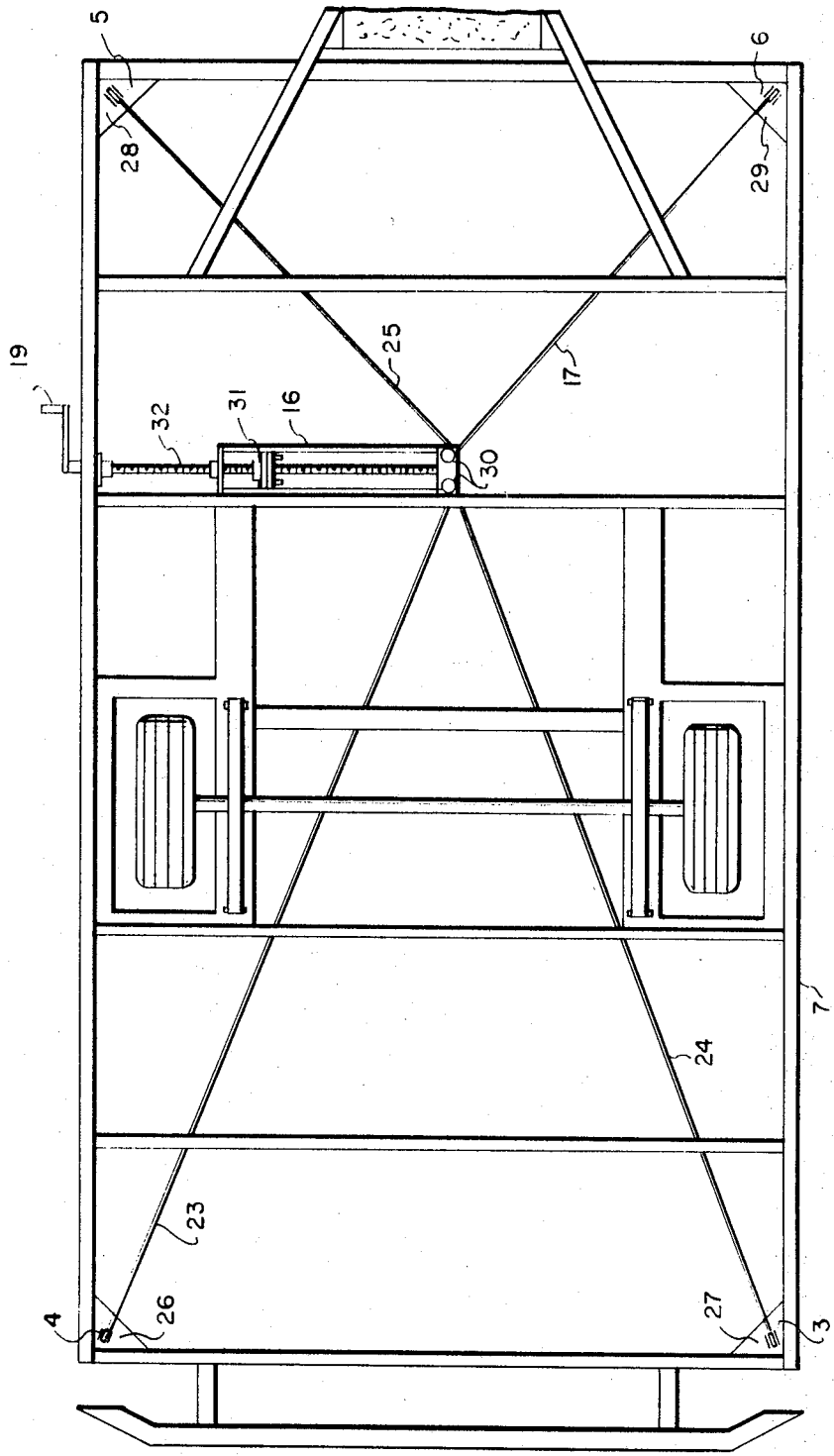
Figure 4:
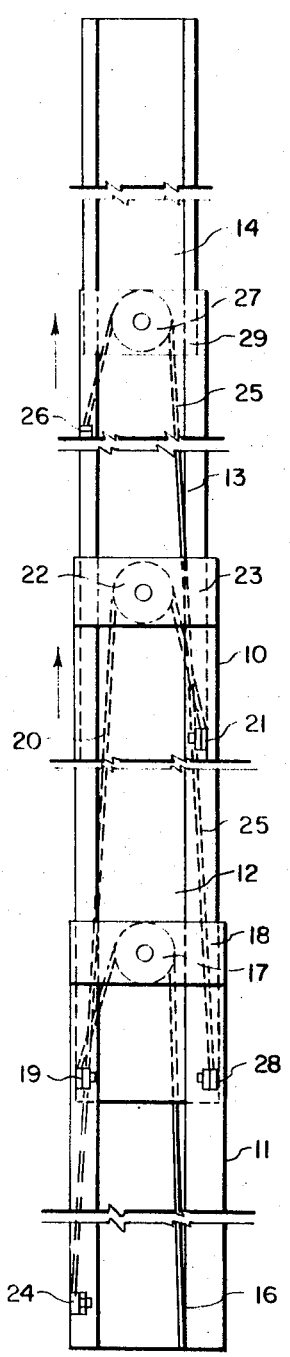
Figure 5:
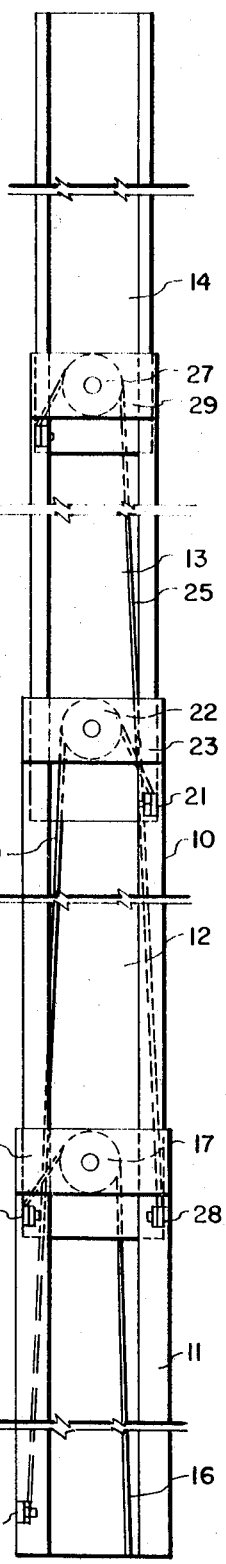
Figure 6:
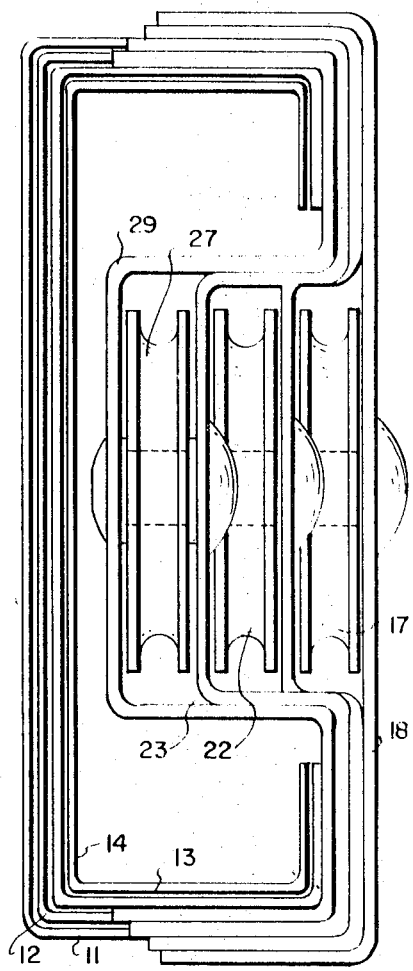

In the drawings:
FIG. 1 is a side view of the camping trailer in collapsed state, ready for road travel.
FIG. 2 is a side view of the trailer expanded for occupancy, the left half being broken away at the front to show the interior in section.
FIG. 3 is a bottom plan view showing the manual operating mechanism for extending the posts to raise the top.
FIG. 4 is an elevational view of one of the extensible posts partially expanded.
FIG. 5 is an elevational view of a post when expanded.
FIG. 6 is a top plan view of an extensible post.
FIG. 7 is a perspective view of a slidable support for one side of a bed.
FIG. 8 is a cross section of the slidable support of FIG. 7, taken on line 8—8.
FIG. 9 is a detail sectional view of the manual operating mechanism shown in FIG. 3.
FIG. 10 is a fragmentary side elevation of the mechanism of FIG. 9, with parts broken away.

DESCRIPTION OF INVENTION

The camping trailer as shown generally in FIGS. 1 and 2 includes the trailer body A, a rigid top B, fabric side walls C and ends D, and bunks E, which are slidable in and out of the trailer body. When closed for travel, the top B fits over the trailer body A, as seen in FIG. 1, to enclose and protect the fabric walls as well as the contents, and form a compact vehicle for towing by an automobile.

The top B may be raised by four telescoping posts 10, one at each corner of the trailer body. Each post is formed of four sections 11, 12, 13, 14, each section 11 being fixed on the trailer body A and each section 14 to the top B by a bracket 15. Each section is a modified box shape, and each section 11, 12 or 13 carries a bracket and pulley at its upper end.

A cord 16 from the central operating mechanism extends upwardly in section 11, around pulley 17 on bracket 18 at its upper end and is connected to the lower end of section 12 at 19. A cord 20 fixed at one end at 21 to the lower end of section 13 extends over pulley 22 on bracekt 23 fixed to section 12 and at its opposite end is fixed at 24 to the lower end of section 11. A third cord 25 connected at one end to section 14 at 26 extends over pulley 27 on bracket 29 fixed on section 13 and is connected at its other end to the lower end of section 12 at 28.

The four cords 16 to the extensible posts pass through the floor of trailer A, see FIG. 3, over pulleys 31 and 32 to a manual operating mechanism 30. The four cords are connected by threaded terminals 33 and nuts 34 to a plate 35, bolted to traveling nut 36 for movement by the threaded shaft 37. This shaft is mounted in the support 38, one end of which is provided with bearings 39 for the shaft 37.

The shaft 37 is rotated by a stub shaft 40, a sleeve 41 connecting the two shafts. This stub shaft 40 is rotated by a manual crank through the nut 42 and associated clutch and brake mechanism.

The shaft 40 extends through a ratchet wheel 43 rotating in bearing 44 fixed in a plate 45 in the side frame 46 of the trailer body A.

The nut 42 is threaded on the end of shaft 40 and is held on the shaft by a washer 47 and small cap screw 48 threaded in the end of the shaft. On shaft 40, inside of the ratchet wheel 43 is staked a brake flange 49. An outer brake washer 50 is placed between the nut 42 and the ratchet wheel 43 and an inner brake washer 51 is placed between the ratchet wheel and the brake flange 49. The pawl 52, pivoted on plate 45, allows clockwise rotation of the ratchet wheel 43, but prevents reverse rotation of the ratchet wheel 43.

When crank 80 rotates nut 42, the nut threads up against washer 50 and clamps the ratchet wheel against washer 51 and brake flange 49 fixed on the shaft 40 to rotate shafts 40 and 37 and draw cords 16 to extend the posts 10. The nut 42 thus clamps the shaft 40 to the ratchet wheel 43, which is held by pawl 52, and prevents retrograde movement of the shafts and cords. When the nut 42 is rotated in the reverse direction, the brake washers are loosened from ratchet wheel 43, and the shafts 40 and 37 may be rotated to allow the cords 16 to slacken and lower top B.

The bunks E are mounted to slide in and out at opposite ends of the trailer body A. For this purpose, hollow rails 60 are mounted on the sides of the trailer body and extensions 61 slide in the rails 60. Vinyl strips 69 at the top and bottom inside each rail 60 reduce friction of the extension 61.

Each side of the bunk carries vinyl slides 62 which move in the extensions 61. A stop 63 at the outer end of extension 61 is engaged by a slide 62 to move the extension outwardly and limit movement of the bunk.

The extension 61 carries a latch element 64 on its inner side, with its end projecting outwardly through an opening 65 in the extension. Upon outward movement of the extension, the latch element engages in a slot 66 in the rail 60 to limit movement of the extension. The latch element is inclined rearwardly, so that it will be cammed out of opening 66 upon pressure on the extension 61.

The bunks are easily slid outwardly, the outer slides 62 engaging the stops 63 on the outer ends of extensions 61 to move the extensions outwardly and limit movement of the bunks. Latches 64 limit movement of the extensions. The bunks are easily moved back into the body, latches 64 being cammed out of the slots 66, and stops 67 limiting inward movement of the extensions and bunks. Braces 68 may be engaged to support the bunks and detached before inward movement.

The fabric side walls 70 are fastened to the top and sides of the trailer body, while the ends 71 are fastened to the top and bunk frames. Lifting the top raises the sides and ends, and the bunks may then be slid out with the fabric ends attached to form protectors for the bunks. The pivoted bows 72 connected to the bunk frames assume the positions shown to support the ends. Shields 73 extend over windows in the ends. The front fabric wall is provided with an opening 74 to cooperate with the door 75 in the side of the trailer body. In the opposite wall, a large opening 76 is closed with a zipper fastener 77.

The operation of opening and closing the camper will now be clear. Applying a crank to nut 42 of the manual operating mechanism, the cords 16 are pulled by the nut 36 over pulleys 17, raising sections 12 of the extensible posts 10. Sections 12 raising pulleys 22 cause ropes 20 to raise sections 13, while the pulleys 27 on sections 13 pull on ropes 25 to raise sections 14. As the ratchet wheel 43 is locked by pawl 52, the brake washers prevent rotation of the shaft and thus keep the top in raised position. Initial rotation of nut 42 to lower the top frees the shaft from the ratchet wheel and it is readily lowered.

After the top is raised, the bunks are slid out on the rails carrying the end walls out to their protecting position. The bunks are easily returned in the same manner.

While one embodiment of the invention has been described and illustrated as an example of this invention, other modifications may be made within the scope of the appended claims.

I claim:
1. A camping trailer comprising a rectangular body having low side walls, a rigid top substantially the size of said body and resting on said body in closed position, telescoping supports for said top at the corners of said body for raising said top and for supporting it in raised position, each of said supports having a first section fixed to said body, a fourth section fixed to said top, and second and third intermediate sections, a first cord connected to the lower end of the second section and passing over a pulley at the upper end of the first section and connected to a central manual operating mechanism at one side of said trailer body, other separate cords for raising the third and fourth sections when the second section is raised, a connector threaded on a shaft of said central manual operating mechanism to which all said first cords from said telescoping supports are connected, means for rotating said shaft for moving said connector member, said means including a manually rotatable member and friction means connecting said member to said shaft to rotate said shaft to pull said cords and raise said top, said friction means including a member held against retrograde movement so as to prevent retrograde movement of said shaft, said manually rotatable member releasing said friction means on reverse rotation.

2. In a camping trailer having top raising mechanism, a plurality of cords for operating said mechanism to raise said top, a connector to which said cords are connected, and a rotatable shaft engaging said connector for moving said connector to pull said cords, a nut threaded on the end of said shaft, a flange spaced from said nut fixed on said shaft, a ratchet wheel rotatable on said shaft, a friction washer between said flange and said ratchet wheel, and a second friction washer between said nut and said ratchet wheel, so that rotation of said nut produces a frictional drive between said nut, ratchet wheel and flange to rotate said shaft, and means to prevent retrograde rotation of said ratchet wheel so that the frictional engagement of said ratchet wheel prevents rotation of said shaft and maintains said top raised position until said nut is loosened.

3. In a camping trailer as claimed in claim 2, in which a stop for said nut is provided on the end of said shaft to abut said nut when rotated in the opposite direction, so that said nut may rotate said shaft in the reverse direction to slacken said cords and allow said top to be lowered.

4. A camping trailer comprising a rectangular body having low side walls, a rigid top substantially the size of said body and resting on said body in closed position, telescoping supports for said top at the corners of said body for raising said top and supporting it in raised position, two bunks slidably mounted on the side walls of said body and movable oppositely and outwardly on extensible slides on said side walls which support said bunks outwardly of said body, each of said top supports comprising four telescoping sections, one of which is fixed to said body, a cord passing upwardly of said fixed section and over a pulley at the top of said fixed section and connected to the lower end of the second section, a second cord connected at one end to the lower end of the second section and passing over a pulley fixed to the top end of the third section and connected at its other end to the lower end of the fourth section and a third cord connected to the lower end of the third section and passing over a pulley fixed to the top end of the second section and connected at its other end to the first section, so that pull on the four first cords extends the telescoping posts to raise the top, said first cords extending to a central manual operating mechanism and connected to a movably threaded connector means, a shaft on which said connector means is threaded, and manually operated means for rotating said shaft to move said connector means and pull said cords to raise the top, said manually operated means including a releasable friction connection for rotating said shaft and for frictionally resisting retrograde movement to maintain said top in raised position, said bunks being mounted on slides having extensions slidable in rails on the sides of said trailer body so that said bunks may be slid outwardly of said body when said top is in raised position, and fabric side and end walls raised by said top and extended by outward movement of said bunks to protect the bunks and interior of said camping trailer.

References Cited

UNITED STATES PATENTS 3,321,876   5/1967   Birkenheuer _____ 296—27
3,314,715   4/1967   Bontrager _____ 296—23

PHILIP GOODMAN, Primary Examiner

U.S. Cl. X.R.

296—27; 52—66